US010627295B2

(12) United States Patent
Ungerbuehler et al.

(10) Patent No.: US 10,627,295 B2
(45) Date of Patent: Apr. 21, 2020

(54) MARINE VESSEL SHAFT BEARING OVERHEAT MONITOR AND ALARM SYSTEM

(71) Applicants: David Richard Ungerbuehler, Oakland Park, FL (US); Harvey W. Chaples, Oakland Park, FL (US)

(72) Inventors: David Richard Ungerbuehler, Oakland Park, FL (US); Harvey W. Chaples, Oakland Park, FL (US)

(*) Notice: Subject to any disclaimer, the term of this patent is extended or adjusted under 35 U.S.C. 154(b) by 0 days.

(21) Appl. No.: 16/278,347

(22) Filed: Feb. 18, 2019

(65) Prior Publication Data

US 2019/0265111 A1 Aug. 29, 2019

Related U.S. Application Data

(63) Continuation of application No. 62/607,552, filed on Dec. 19, 2017.

(51) Int. Cl.
| | | |
|---|---|---|
| *G01K 13/08* | (2006.01) | |
| *B63H 23/32* | (2006.01) | |
| *F16C 17/24* | (2006.01) | |
| *G01K 1/14* | (2006.01) | |
| *F16C 17/14* | (2006.01) | |

(52) U.S. Cl.
CPC .......... *G01K 13/08* (2013.01); *B63H 23/326* (2013.01); *F16C 17/14* (2013.01); *F16C 17/243* (2013.01); *G01K 1/14* (2013.01); *F16C 2326/30* (2013.01)

(58) Field of Classification Search
CPC ......... B63H 5/00; B63H 5/10; B63H 23/326; G01K 13/00; G01K 13/08; G01K 1/00; G01K 1/14; F16C 17/00; F16C 17/14; F16C 17/243; B63J 3/00; B63J 3/02

USPC ..................................................... 440/82, 83
See application file for complete search history.

(56) References Cited

U.S. PATENT DOCUMENTS

| | | |
|---|---|---|
| 3,824,579 A | 7/1974 | Waseleski et al. |
| 4,074,575 A | 2/1978 | Bergman et al. |
| 4,167,734 A | 9/1979 | Logan et al. |
| 4,316,175 A | 2/1982 | Korber et al. |
| 4,354,183 A | 10/1982 | Weeks et al. |
| 5,216,421 A | 6/1993 | Sawada et al. |
| 5,433,525 A | 7/1995 | El-Ibiary |
| 5,446,452 A | 8/1995 | Litton |
| 5,582,528 A | 12/1996 | Rafferty et al. |
| 5,642,105 A | 6/1997 | Duffy et al. |
| 5,952,587 A | 9/1999 | Rhodes et al. |
| 6,015,233 A | 1/2000 | Hicks |

(Continued)

FOREIGN PATENT DOCUMENTS

WO 2013162328 A1 10/2013

*Primary Examiner* — Lars A Olson

(57) ABSTRACT

A monitor and alarm system is provided for a marine vessel having a rotatable propeller drive shaft supported by one or more water-cooled bearings contained in strut barrels mounted on struts extending from the vessel hull or in stern tube assemblies. A heat sensor on the hull senses the ambient temperature of the water surrounding the vessel and one or more sensors on one or more bearings sense the temperature of the bearings. The sensed temperatures are electrically communicated via wires or wirelessly to gauges for monitoring and to a processing unit. The processing unit compares the sensed temperatures and generates a signal to an alarm device to initiate a bearing overheat warning or alarm if the differential between the bearing temperature and the ambient water temperature exceeds a predetermined amount.

16 Claims, 4 Drawing Sheets

(56) References Cited

U.S. PATENT DOCUMENTS

| | | |
|---|---|---|
| 6,325,687 B1 | 12/2001 | Ungerbuehler et al. |
| 2008/0169652 A1 | 6/2008 | Green |
| 2009/0284362 A1 | 11/2009 | Wilson et al. |
| 2016/0091017 A1 | 3/2016 | Mueller |

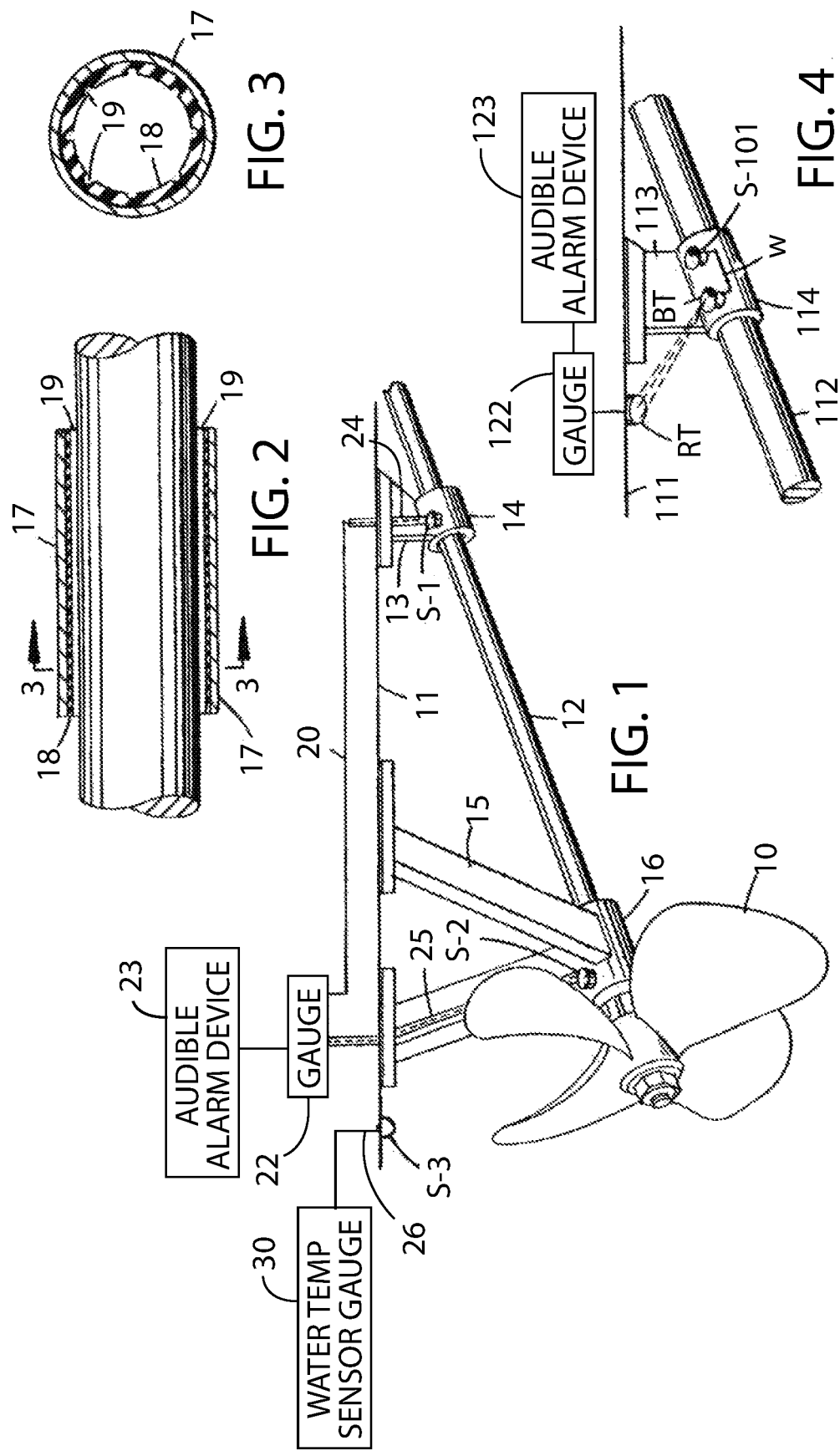

MARINE VESSEL SHAFT BEARING OVERHEAT MONITOR AND ALARM SYSTEM

CROSS REFERENCE TO RELATED APPLICATIONS

The present application claims priority to U.S. Provisional Application No. 62/607,552 filed Dec. 19, 2017. The aforementioned provisional application is incorporated herein by reference in its entirety.

STATEMENT REGARDING FEDERALLY SPONSORED RESEARCH OR DEVELOPMENT

Not applicable to this application.

BACKGROUND

Field

This invention relates generally to a system for monitoring the temperature of bearings for drive shafts of marine vessel propellers and providing an indication in the event of an overheat condition.

Related Art

Any discussion of the related art throughout the specification should in no way be considered as an admission that such related art is widely known or forms part of common general knowledge in the field.

Various arrangements have been proposed for detecting the overheating of oil-lubricated anti-friction bearings in diverse types of equipment in which the bearing surfaces normally do not come into contact with water. Examples of such arrangements are disclosed in the following U.S. patents: Waseleski et al. U.S. Pat. No. 3,824,579, Bergman et al. U.S. Pat. No. 4,074,575, Logan et al. U.S. Pat. No. 4,167,734, Korber et al. U.S. Pat. No. 4,316,175, Weeks et al. U.S. Pat. No. 4,354,183, El-Ibiary U.S. Pat. No. 5,433,525, Litton U.S. Pat. No. 5,446,452, Duffy et al. U.S. Pat. No. 5,642,105, Rhodes et al. U.S. Pat. No. 5,952,587, and Hicks U.S. Pat. No. 6,015,233.

It is a conventional practice on water vessels to provide one or more struts extending down from the bottom of the vessel and each holding a bearing which rotatably supports the vessel's propeller drive shaft. Commonly, such bearings are formed with longitudinal water passages next to the propeller shaft to keep the bearing water-cooled or lubricated by the vessel's movement through the water. Any significant restriction of water flow through the bearing—such as can occur when a line or other item becomes entangled or wrapped around the propeller shaft or propeller, or when some other foreign object or substance gets into the bearing—can cause potentially troublesome overheating of the bearing.

U.S. Pat. No. 6,325,687 issued to the inventors of the present invention describes an overheat indicator for strut bearing and stern tube bearing. One or more heat sensors are mounted on strut and/or stern tubes having bearings supporting a rotating propeller shaft for a marine vessel. The heat sensors sense the bearing temperature and communicate with a gauge and audible alarm device to indicate an overheat condition.

The ambient temperature of water in which a marine vessel sits or travels can vary significantly by location and by season. It can even vary significantly during a particular trip. Prior arrangements for detecting overheating of marine vessel propeller shaft support bearings do not monitor or employ ambient water temperature in determining whether an overheat condition exists.

There is a need for a system that monitors the temperature of bearings for drive shafts of marine vessel propellers and that provides an indication in the event an overheat condition is detected, and that further monitors and employs the ambient temperature of the water to more accurately determine whether an overheat condition exists.

SUMMARY

An ambient water temperature sensor is provided on a hull or other surface of a marine vessel having a rotatable drive shaft and propeller. One or more strut barrels or stern tubes are mounted on the vessel and contain bearings rotatably supporting the drive shaft. The bearings are in communication with and are cooled by surrounding water. One or more heat sensors are provided on one or more of the strut barrels and/or stern tubes to monitor the temperature of the bearings. The ambient water temperature sensor and heat sensors may communicate the ambient water temperature and bearing temperatures to one or more displays on the vessel for monitoring the temperatures. The ambient water temperature sensor and heat sensors also may communicate the ambient water temperature and bearing temperatures to a processing unit on the vessel. The processing unit compares the ambient water and bearing temperatures to determine if an overheat condition exists and communicates a signal to one or more monitors and/or indicators on the vessel to initiate a warning or alarm.

BRIEF DESCRIPTION OF THE DRAWINGS

Example embodiments will become more fully understood from the detailed description herein below and the accompanying drawings, wherein like elements are represented by like reference characters. The descriptions and drawings provided herein are for illustrative purposes only and are not intended to limit the scope of the invention.

FIG. 1 is a perspective view of a portion of the stern of a marine vessel having a rotatable propeller drive shaft supported in tubes, a propeller, and ambient water temperature and bearing heat sensors in communication with display and alarm indicators on the vessel.

FIG. 2 is a longitudinal section through a bearing contained in a strut barrel or stern tube housing.

FIG. 3 is cross-section of the bearing of FIG. 2 taken along line 3-3.

FIG. 4 is a partial perspective view similar to FIG. 1 illustrating a second example embodiment with a heat sensor and wireless transducer mounted on a propeller drive shaft support bearing.

DETAILED DESCRIPTION

Figure 5:
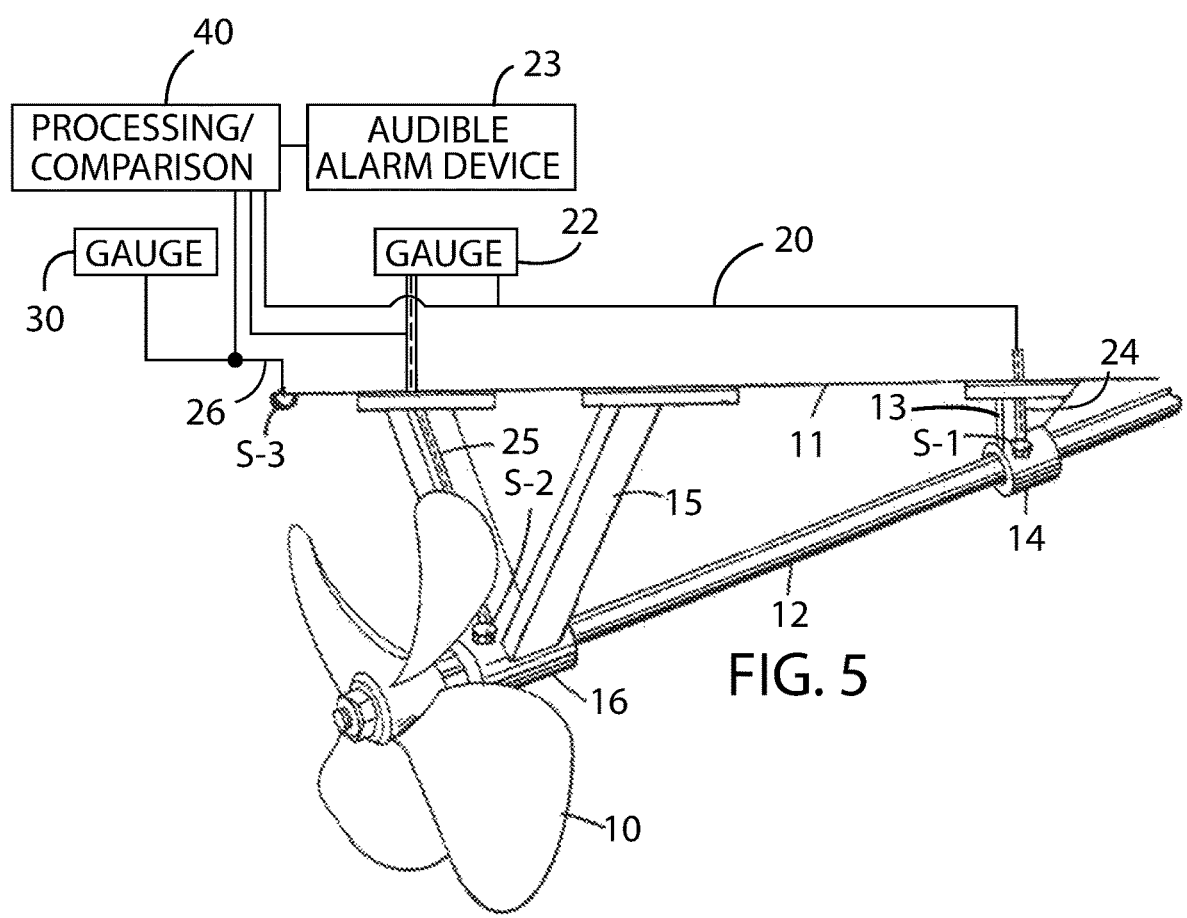
FIG. 5 is a perspective view similar to FIG. 1 illustrating the ambient water temperature and bearing heat sensors in communication with a processing unit, displays, and an alarm indicator on the vessel.

Referring to FIG. 1, the propeller 10 of a marine or water vessel 11 is attached to the free end of a rotary propeller drive shaft 12 driven by an engine (not shown) on the vessel. A forward strut 13, also referred to as an intermediate strut, is bolted at the top to the underside of the vessel and on its lower end presents a cylindrical barrel or stern tube 14 which holds an anti-friction marine bearing of known design for rotatably supporting the propeller drive shaft near where it is coupled to the engine. A rear or aft strut 15 of generally V-shaped configuration has its upper end bolted to the vessel toward the propeller and on its lower end presents a cylindrical barrel or stern tube 16 holding another anti-friction marine bearing of known design which rotatably supports the propeller drive shaft 12 a short distance from the propeller. Alternatively, the rear or aft strut can be a post or have a shape other than a V-shape.

FIGS. 2 and 3 show in detail one of the bearings carried by and contained within the struts. Each of these bearings is of known design. The bearing comprises a cylindrical outer shell 17, which may be of naval brass or of fiberglass and epoxy resin, and a tubular inner sleeve 18 of oil-resistant soft rubber glued to the inside of the outer shell 17. The bearing is press fitted hydraulically into the barrel 14 or 16 of the corresponding strut 13 or 15 and is secured by set screws (not shown).

The rubber inner sleeve 18 of the bearing is fluted on the inside, presenting a series of circumferentially spaced longitudinal grooves or channels 19 which extend the entire length of the bearing and are open at the opposite ends of the strut barrel 14 or 16. These grooves or channels provide water passages next to the surface of the propeller shaft, and when the vessel is under way its movement through the water draws water through these passages to lubricate and cool the bearing and the propeller shaft at their bearing surfaces.

In an example embodiment, a heat sensor of known design is mounted on each bearing to detect overheating of the bearing. In the particular two strut arrangement shown in FIG. 1, a pyroelectric transducer S-1 is the heat sensor for the bearing held by the forward strut 13, and a similar transducer S-2 is the heat sensor on the bearing held by the rear strut 15. In each the transducer is secured in a drilled and tapped opening in the side wall of the barrel of the corresponding strut. These transducers are electrically connected by respective wiring 20 and 21 to a visual gauge 22 of known design and, preferably, also to an audible alarm device 23 of known design, such as a bell, horn or siren that can be heard by the crew of the vessel over the engine noise. In addition, the indicator arrangement may include a light that goes on in response to bearing overheating to get the attention of persons on the vessel. It will be appreciated that while a single gauge 22 and alarm device 23 are illustrated, a separate gauge and alarm device could be provided dedicated to each transducer S-1, S-2.

From each heat sensor S-1, S-2 to the hull of the vessel, the wiring is enclosed in water-tight fashion by a corresponding stainless steel tube or sleeve 24 or 25. Alternatively, a passageway can be provided through the interior of the struts 13, 15 and the wiring enclosed therein. Each temperature sensor may be a thermistor, for example, or a thermocouple or a temperature-sensitive crystal.

A temperature sensor S-3, also of known design is mounted on a surface of the vessel, such as a surface of hull, in contact with the surrounding water. Preferably, the sensor S-3 is mounted in the vicinity of the strut barrels and/or stern tubes 14 and 16. The sensor may be mounted in conventional fashion, for example using suitable fastener hardware and/or a suitable adhesive. The sensor S-3 is electrically connected by suitable wiring 26 through a water-tight opening in the hull to a visual gauge 30 of known design on the vessel. The sensor S-3 detects the ambient temperature of the surrounding water which is displayed on the gauge 30. The sensed ambient temperature of the surrounding water can thus be readily compared with the sensed bearing temperatures displayed by the gauge 22.

Because the ambient temperature of the surrounding water can vary significantly up or down, knowing the sensed ambient temperature in relation to the sensed bearing temperatures is useful to assess the extent to which a sensed rise in bearing temperature may be due to a rise in ambient water temperature rather than a cooling water flow problem. Comparing the sensed bearing temperature to the sensed ambient water temperature, which can fluctuate as described herein, e.g., due to thermoclines, enables a more accurate determination to be made whether a bearing overheat condition actually exists than by simply determining the bearing temperature has risen by an absolute predetermined number of degrees. Thus, for example, even if the sensed bearing temperature has triggered the alarm device 23, it can be readily determined whether an actual overheat condition exists, or whether a rise in the ambient temperature is at least partially responsible, such that the alarm device may be providing a false alarm.

In another example embodiment shown in FIG. 4, a pyroelectric heat sensor S-101 on the barrel 114 of the propeller shaft bearing held by the forward strut 103 is connected electrically by suitable water-tight, insulated wiring W to an electroacoustic broadcast transducer BT positioned nearby, preferably also on barrel 114. In response to the temperature of this bearing, the heat sensor S-101 sends an electrical signal via wiring W to the broadcast transducer BT, which converts this electrical signal into an acoustic signal in the form of a pressure wave that is transmitted through the water to an electroacoustic receiving transducer RT on the hull 111 of the vessel. Transducer RT converts this acoustic signal into a corresponding electrical signal which passes through suitable wiring on the vessel to the visual gauge 122 and/or the visual alarm device 123.

It is to be understood, of course, that the acoustic coupling arrangement shown in FIG. 4 for the forward propeller shaft bearing could be used as well on the rear bearing and as well for the ambient water temperature sensor on the hull or other surface of the vessel. Further, a single two strut installation may combine both a wired arrangement as shown in FIG. 1 (at one strut) and an acoustic arrangement as shown in FIG. 4 (on the other strut).

Also, it is to be understood that either of the foregoing example embodiments can be applied to a vessel having just one strut bearing for the propeller shaft, or to a vessel having a plurality of propeller drive shafts each being supported by one or more strut bearings.

In another example embodiment illustrated in FIG. 5, the sensors S-1, S-2, and S-3 are electrically connected by wiring both to gauges 22 and 30 and to a processing unit 40. The processing unit is in turn electrically connected to the alarm device 23. The processing unit receives the sensed ambient temperature of the surrounding water and the sensed temperatures of the propeller drive shaft support bearings in the tubes 14, 16. The processing unit electronically compares the bearing temperatures with the ambient water temperature. If the differential exceeds a preset amount, the processing unit electrically communicates a signal to the alarm device 23 to initiate a warning or alarm. The processing unit can be of simple and conventional design and can, for example, comprise conventional interface and signal conversion circuitry, simple dedicated or programmable logic or the like. While the processing unit is illustrated as a separate component, it is understood that it can alternatively be integrated into one or more of gauges 22 and 30 and/or alarm device 23.

Figure 6:
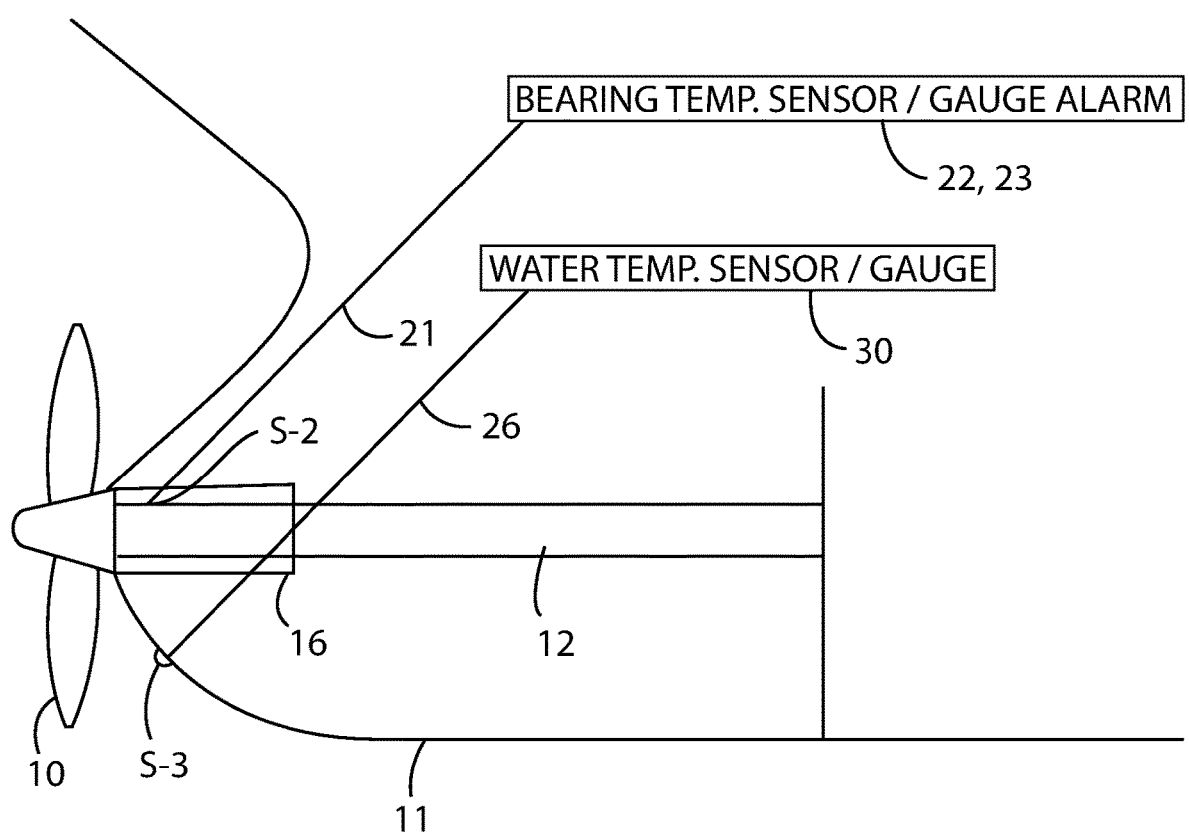
FIG. 6 is a schematic partial cut-away starboard side view of the stern portion of a marine vessel having a rotatable propeller drive shaft supported by a stern tube bearing, a propeller, and ambient water temperature and bearing heat sensors in communication with display and alarm indicators on the vessel.

Another example embodiment illustrated in FIG. 6 is similar to the example embodiment of FIG. 1 with some variations. In this embodiment, the stern tube or tail shaft tube 16 that supports the propeller drive shaft 12 on one or more bearings is mounted at or near the stern of the marine water vessel's hull 11 and inside the hull 11 with the propeller 10 being connected to the distal end of the drive shaft outside the hull. In such an arrangement, the cooling or lubricating water for the bearing contained within the tube 16 may be forced into the bearing by the water pressure resulting as the vessel is underway or simply due to the depth below the surface of the surrounding water. In another arrangement, the cooling or lubricating water may be provided by a raw water pump (not shown), which draws the water from the water surrounding the vessel through a through-hull connection in the vessel's hull and directs it to the bearings. In either case, the cooling or lubricating water may then be evacuated and the temperature monitored before discharge.

As in the embodiment of FIG. 1, heat sensor S-2 senses the temperature of the bearing contained in tube 16 and electrically communicates it to the gauge 22, which displays it, and to alarm 23, which may initiate a warning or alarm indication in the event a bearing overheat condition is detected. This embodiment illustrates that the gauge and alarm may be separate units or may be integrated in a single physical unit.

Also as in FIG. 1, the sensor S-3 mounted on the outside of the hull 11 senses the ambient temperature of the surrounding water and communicates it electronically via wiring 26 to gauge 30 where it is displayed. In the same manner described previously, the sensed ambient water temperature informs the determination whether a detected rise in sensed bearing temperature indicates an actual bearing overheat condition.

Figure 7:
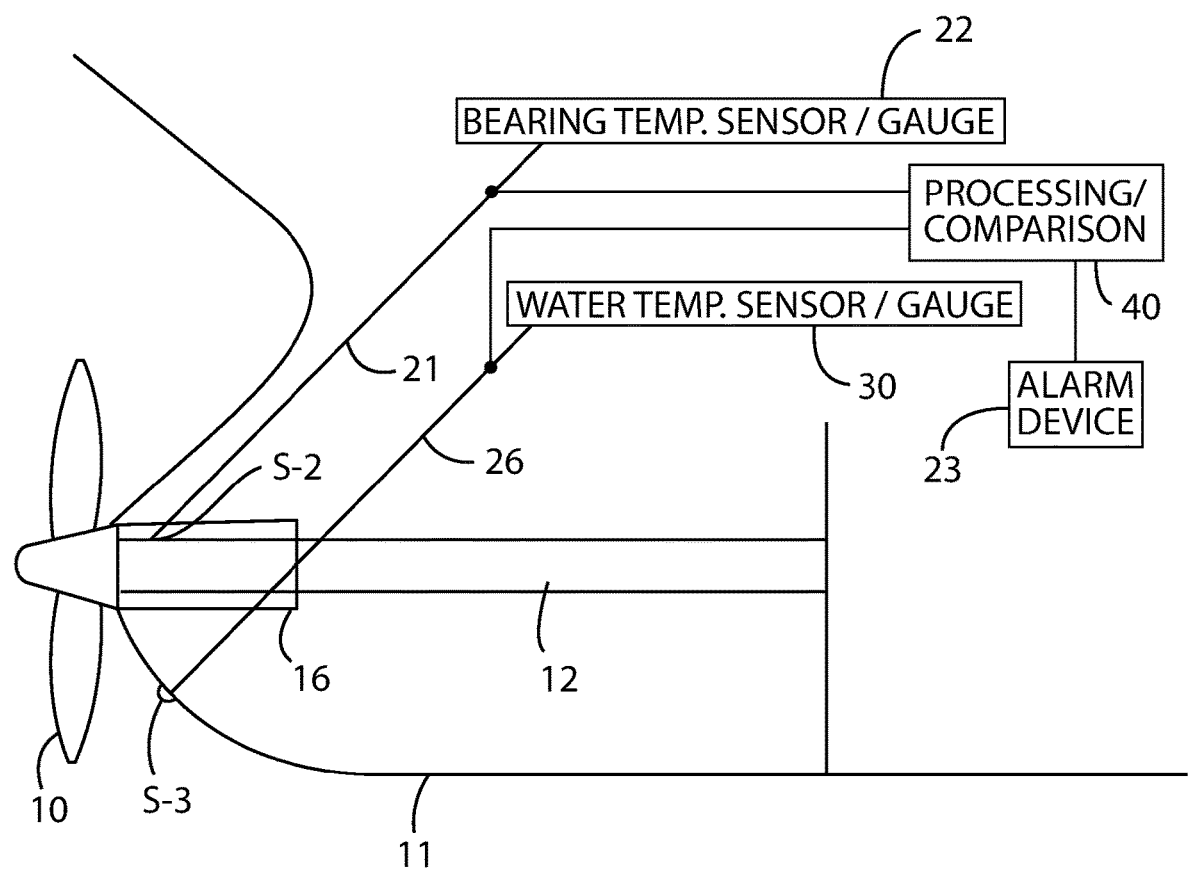
FIG. 7 is a schematic partial cut-away starboard side view of the stern portion of a marine vessel having a rotatable propeller drive shaft supported by a stern tube bearing, a propeller, and ambient water temperature and bearing heat sensors in communication with a processing unit, display and an alarm indicator on the vessel.

Another example embodiment illustrated in FIG. 7 is similar to the example embodiment of FIG. 6 with variations as in the embodiment of FIG. 5. In this embodiment, sensor S-2 electrically communicates the sensed bearing temperature both to gauge 22 and processing unit 40. Similarly, sensor S-3 electrically communicates the sensed ambient water temperature to both gauge 30 and processing unit 40. The processing unit is electrically connected to the alarm device 23. The gauges visually display the temperatures allowing for monitoring. The processing unit, as previously described, compares the sensed temperatures and generates a signal to the alarm device to initiate a warning or alarm if the differential between the temperatures exceeds a preset amount.

Unless otherwise defined, all technical and scientific terms used herein have the same meaning as commonly understood by one of ordinary skill in the art to which this invention belongs. Although specific terms are employed herein, they are used in a generic and descriptive sense only and not for purposes of limitation.

Although several example embodiments have been illustrated and described herein, it is understood that the present invention may be embodied in other specific forms without departing from the spirit or essential attributes thereof, and it is therefore desired that the example embodiments be considered in all respects as illustrative and not restrictive. Many modifications and other embodiments of the marine vessel shaft bearing overheat monitor and alarm system described herein will come to mind to those skilled in the art to which this invention pertains and having the benefit of the teachings presented in the foregoing description and the associated drawings. Therefore, it is to be understood that the invention is not intended to be limited to the specific embodiments disclosed and that modifications and other embodiments are intended to be included within the scope of the invention as determined by the claims.

What is claimed is:

1. A system comprising:
   a bearing adapted to support a rotatable drive shaft for a propeller of a marine vessel with a hull, wherein the bearing is in communication with water surrounding the vessel for cooling the bearing;
   a first temperature sensor in communication with the bearing for sensing and communicating the temperature of the bearing;
   a second temperature sensor in communication with the water surrounding the vessel for sensing and communicating the ambient temperature of the water
   a processing unit in communication with the first temperature sensor and second temperature sensor for receiving and comparing the temperature of the bearing and the ambient temperature of the water, wherein the processor is operable to generate a signal if the temperature of the bearing exceeds the ambient temperature of the water by more than a selected amount; and
   an alarm device in communication with the processing unit and responsive to the signal to provide an indication that a bearing overheat condition exists.

2. The system of claim 1, wherein the bearing is positioned outside the hull in communication with the water.

3. The system of claim 1, wherein the bearing is positioned inside the hull in communication with the water.

4. The system of claim 1, wherein the bearing is contained within a tube connected to the hull of the vessel and the first temperature sensor is attached to the tube.

5. The system of claim 4, wherein the tube is connected to a strut extending from the hull of the vessel.

6. The system of claim 5, wherein the second temperature sensor is attached to the hull of the vessel.

7. The system of claim 6, wherein at least one of the first temperature sensor and the second temperature sensor is electrically connected to the processing unit by wires.

8. The system of claim 6, wherein at least one of the first temperature sensor and the second temperature sensor is connected to the processing unit by a wireless transducer.

9. The system of claim 1, comprising:
   a display in communication with the first temperature sensor and the second temperature sensor for displaying the temperature of the bearing and the ambient temperature of the water.

10. The system of claim 9, wherein the bearing is positioned outside the hull in communication with the water.

11. The system of claim 9, wherein the bearing is positioned inside the hull in communication with the water.

12. The system of claim 9, wherein the bearing is contained within a tube connected to the hull of the vessel and the first temperature sensor is attached to the tube.

13. The system of claim 12, wherein the tube is connected to a strut extending from the hull of the vessel.

14. The system of claim 13, wherein the second temperature sensor is attached to the hull of the vessel.

15. The system of claim 14, wherein at least one of the first temperature sensor and the second temperature sensor is electrically connected to the processing unit by wires.

16. The system of claim 14, wherein at least one of the first temperature sensor and the second temperature sensor is connected to the processing unit by a wireless transducer.

* * * * *